F. B. SHUSTER.
PRESSURE CONTROLLED GAS VALVE.
APPLICATION FILED OCT. 28, 1901.

966,611.

Patented Aug. 9, 1910.
2 SHEETS—SHEET 1.

WITNESSES
H. A. Lamb.
L. R. Hoyt.

INVENTOR.
Franklin B. Shuster.
By his Atty.
Geo. W. Phillips

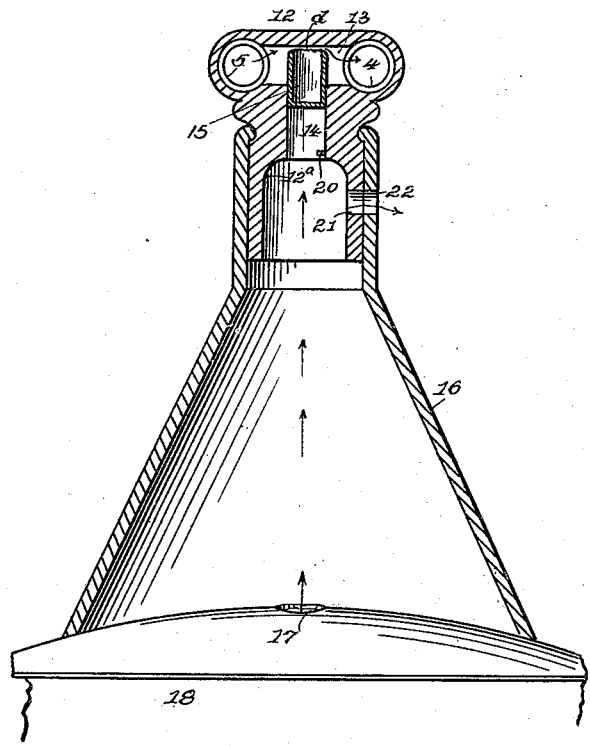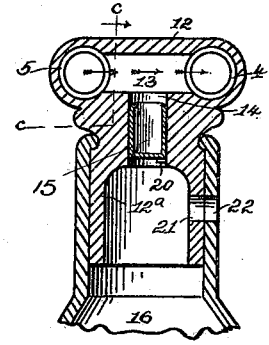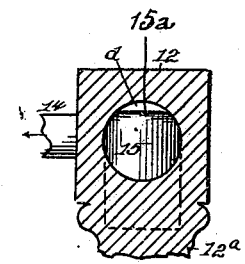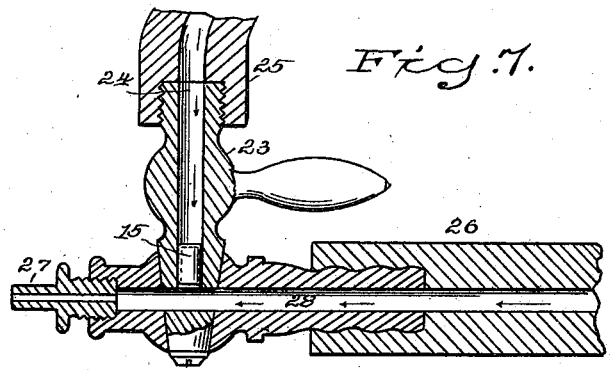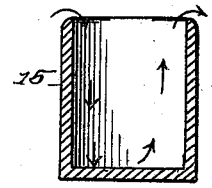

UNITED STATES PATENT OFFICE.

FRANKLIN B. SHUSTER, OF NEW HAVEN, CONNECTICUT.

PRESSURE-CONTROLLED GAS-VALVE.

966,611.      Specification of Letters Patent.      Patented Aug. 9, 1910.

Application filed October 28, 1901. Serial No. 80,165.

*To all whom it may concern:*

Be it known that I, FRANKLIN B. SHUSTER, citizen of the United States, and resident of New Haven, in the county of New Haven and State of Connecticut, have invented certain new and useful Improvements in Pressure-Controlled Gas-Valves, of which the following is a specification.

My invention relates to an improvement in gas-valves, and it consists in providing means whereby the pressure of the gas is regulated by the pressure of the steam generated over a gas-flame so that, when the steam has reached a certain pressure it will cause a lowering of the gas pressure.

To enable others to understand my invention reference is had to the accompanying drawings in which:—

Figure 1:
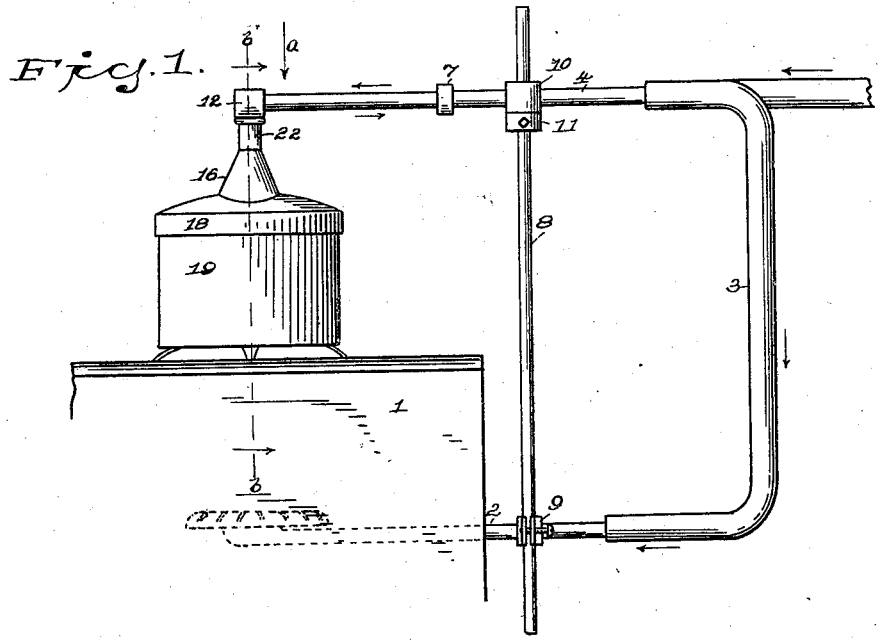
Figure 2:
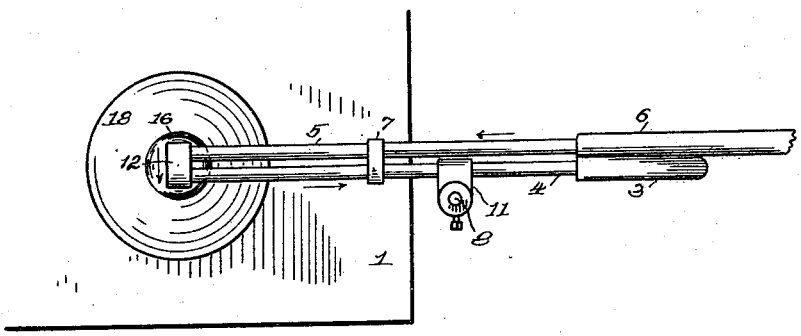

Figure 1, represents a broken side elevation of an ordinary gas-stove with a kettle thereon, showing my improvement attached thereto and broken view of the gas-supply pipe: Fig. 2 is an upper plan view looking in the direction of arrow $a$ of Fig. 1: Fig. 3 is an enlarged sectional view of the gas-pipe head and hood through line $b\,b$ of Fig. 1, showing the float valve at its highest point representing the gas nearly shut off, also broken view of the kettle-lid with a hole through the center for the escape of steam: Fig. 4 is an enlarged sectional view of the gas-pipe head similar to the one shown at Fig. 3, but with the float valve down to its lowest point, also broken view of the funnel: Fig. 5 is an enlarged broken sectional view of the gas-pipe head through line $c\,c$ of Fig. 4 showing the float valve at its highest point: Fig. 6 is an enlarged sectional view of my improved float valve:—Fig. 7 is an enlarged view partly in section of an ordinary cock with the float valve therein also broken sectional view of rubber hose attached to said cock.

Its construction and operation are as follows:

1 represents an ordinary gas stove.

2 is a short pipe projecting outside the stove, the inner end of which is connected with the burner or gas-jet, not shown, 3 is a rubber tube leading to the overhead pipe 4. 5 is a similar pipe to which the gas supply rubber tube 6 is attached. 7 is a coupling holding said pipes together.

8 is a vertical rod adapted to adjustably support the pipes 4 and 5 as follows:—9 is a clamp supported on the short pipe 2 and adapted also to embrace the vertical rod 8. 10 is a block attached to the upper horizontal pipe 4, and below said block and adjustably mounted on the rod 8 is the collar 11. In this manner the pipes 4 and 5 are vertically adjusted for the purpose to be hereinafter more fully described.

The forward ends of the pipes 4 and 5 are anchored in the head 12. The gas coming through the pipe 5 is conveyed through the passage-way 13 of the head to the pipe 4 and from thence to the burner. 14 is a passage in the lower part $12^a$ of said head in which the float-valve 15 operates. This valve is adapted to be carried up across the horizontal passage 13 and check the flow of gas from pipe 5 to pipe 4, presently to be explained.

16, Figs. 1 and 3, is a hood suspended from the lower portion of the head 12 and adapted to embrace the hole 17 in the lid 18 of the kettle 19 sitting on the stove 1.

As before mentioned, the object of my invention is to regulate the gas supply by the pressure of steam generated in a kettle on the gas stove so that a uniform temperature is maintained in the kettle and the danger of boiling over or overheating is avoided. Therefore, when the temperature of the water in the kettle 19 has reached a point where the pressure of steam generated therein is liable to lift the lid, the steam will pass into the hole 14 and lift the float valve 15 from its seat 20 and carry it up into the position shown at Fig. 3 and thus check the supply of gas to the stove. It will not fully shut off the gas as the upper end $15^a$ of the valve 15 is not of the same circular formation as the upper wall of the gas passage 13 so that, when the valve is up, the narrow space $d$, see also Fig. 5, will allow just enough gas to pass by said valve to maintain a low feeble flame at the gas-burner which amount will be sufficient to prevent total extinguishment. Reducing the gas-flame will, of course, lower the heat under the kettle; this will also cause the steam in the kettle to fall and permit the float valve 15 to drop and allow more gas to flow to the burner. By this arrangement, it will readily be seen that the steam can never be raised to a point sufficient to cause damage, nor can there be any waste of gas as the output is fully controlled by the temperature of the kettle, neither is the process of cooking interrupted as a uniform temperature is always maintained therein. It will also be understood that dry heat in a pot or kettle would operate as well as steam to regulate the gas-jet.

It will be observed that the float-valve 15 is hollow or cup shaped with its open mouth uppermost while the solid end is presented to the steam or heat. The object of this is to enable the gas to force the valve down as fast as the pressure underneath falls. In other words, the small stream of gas that escapes by the valve, when the valve is at its highest point, will also fill the interior of said valve and exert a pressure on the bottom, see also Fig. 6. Now, just as soon as the pressure underneath falls, the gas pressure above will tend to carry said valve down and allow more gas to pass to the burner. This result could not be obtained if the valve were simply a solid plug as the area of the top, when the valve was up against the top wall of the passage 13, would be less than the area of the bottom against which the steam acted. Therefore, the valve would not be sufficiently sensitive to respond quickly.

21 is a vent-hole extending through the cylindrical portion 12$^a$, Fig. 3, of the head 12, and 22 is a similar hole in the upper shell like end of the hood 16 that embraces the part 12$^a$. These holes are provided to permit the escape of steam, and, as they coincide with each other, the vent may be increased or decreased to suit the requirements of boiling. In other words, increasing the vent will cause the water in the kettle to boil more rapidly, decreasing it less rapidly.

23 is an ordinary cock with the passage way 24 made large enough to accommodate the valve 15, which valve is similar to the valve shown in the other views.

25 is a rubber tube attached to the cock which may connect with a hole in the lid of a kettle and also be provided with the proper vent-holes, or the hood shown at Figs. 1 and 3 could be used. 26 is the gas supply tube which supplies gas for the burner 27 at the other end of said cock. 28 is the gas passage into which the valve 15 is forced to regulate the supply of gas to said burner.

The supporting rod 8, Fig. 1, enables the hood 16 to be raised and lowered to suit the varying heights of kettles.

I do not wish to be confined to any particular form or construction of the body in which the float valve is used, as the only requirement for the successful operation of the device is a gas-passage across which said float valve is projected to partially shut off the gas, and suitable means whereby the steam or heat from the kettle is communicated to the valve. Further, the valve may be operated in any direction either vertical or horizontal.

Having thus described my invention what I claim as new and desire to secure by Letters Patent is:—

1. In a device of the class described, the combination with a body provided with a gas passage, of a valve arranged in said body and adapted to be projected across said passage for restricting the flow of gas therethrough, and means for conveying to said valve an agent adapted to project the latter across said passage, said device having means for varying the pressure of said agent within said conveying means to regulate the position of said valve in the gas passage, whereby the valve controls the flow of the gas in accordance with the pressure within the conveying means.

2. In a device of the class described, the combination with a body provided with a gas passage and having an inlet and an outlet at each end thereof, of a valve arranged in said body and adapted to be projected across said passage for restricting the flow of gas therethrough, and means for conveying to said valve an agent adapted to project the latter across said passage, said device having means for varying the pressure of said agent within said conveying means to regulate the position of said valve in the gas passage, whereby the valve controls the flow of the gas in accordance with the pressure within the conveying means.

3. In a device of the class described, the combination with a body provided with an inlet and an outlet pipe, a gas supply connected to the inlet pipe, and a burner connected to the outlet pipe, said body being also provided with a passage between said pipes, of a valve arranged in said body and adapted to be projected across the passage thereof for restricting the flow of gas therethrough, and means for conveying to said valve an agent adapted to project the latter across said passage, said device having means for varying the pressure of said agent within said conveying means to regulate the position of said valve in the gas passage, whereby the valve controls the flow of the gas in accordance with the pressure within the conveying means.

4. In a device of the class described, the combination with a body provided with a gas passage, of a valve arranged in said body and adapted to be projected across said passage for restricting the flow of gas therethrough, said valve having one of its ends open and directed toward the gas passage to render the valve sensitive to the flow of the gas, and means for conveying to said valve an agent adapted to project the latter across said passage, said device having means for varying the pressure of said agent within said conveying means to regulate the position of said valve in the gas passage, whereby the valve controls the flow of the gas in accordance with the pressure within the conveying means.

5. In a device of the class described, the combination with a body provided with a gas passage, of a valve arranged in said body and adapted to be projected across said passage for restricting the flow of gas therethrough, and a hood connected to said body and adapted to convey an expansible fluid to said valve for projecting the latter across said passage, said body and hood being provided with vent openings for regulating the pressure of the fluid against said valve.

6. In a device of the class described, the combination with a body provided with a gas passage, of a valve arranged in said body and adapted to be projected across said passage for restricting the flow of gas therethrough, the end of said valve contiguous to said passage being shaped to prevent complete closure of the gas passage when the valve is moved across the same, and means for conveying to said valve an agent adapted to project the latter across said passage, said device having means for varying the pressure of said agent within said conveying means to regulate the position of said valve in the gas passage, whereby the valve controls the flow of the gas in accordance with the pressure within the conveying means.

7. In a device of the class described, the combination with a body adjustably supported and provided with a gas passage, of a valve arranged in said passage and adapted to be projected across said passage for restricting the flow of gas therethrough, the end of said valve contiguous to said passage being shaped to prevent complete closure of the gas passage when the valve is moved across the same, and means for conveying to said valve an agent adapted to project the latter across said passage, said device having means for varying the pressure of said agent within said conveying means to regulate the position of said valve in the gas passage, whereby the valve controls the flow of the gas in accordance with the pressure within the conveying means.

8. In a device of the class described, the combination with a body provided with a gas passage, of a valve arranged in said body and adapted to be projected across said passage for restricting the flow of gas therethrough, the end of said valve contiguous to said passage being shaped to prevent complete closure of the gas passage when the valve is moved across the same, and a hood associated with said body for conveying to said valve an agent adapted to project the latter across said passage, said body and hood having registering apertures for varying the pressure of said agent within said hood to regulate the position of said valve in the gas passage, whereby the valve controls the flow of the gas in accordance with the pressure within the hood.

Signed at Bridgeport in the county of Fairfield and State of Connecticut this 14th day of Sept. A. D. 1901.

FRANKLIN B. SHUSTER.

Witnesses:
A. K. LOVELL,
T. V. ALLIS.